US012469963B2

(12) United States Patent
Choi et al.

(10) Patent No.: US 12,469,963 B2
(45) Date of Patent: Nov. 11, 2025

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Hee Jun Park, Gyeonggi-do (KR); Jae Hyun Lee, Gyeonggi-do (KR)

(73) Assignee: DONGWOO FINE-CHEM CO., LTD., Jeollabuk-Do (KR)

(*) Notice: Subject to any disclaimer, the term of this patent is extended or adjusted under 35 U.S.C. 154(b) by 804 days.

(21) Appl. No.: 17/830,718

(22) Filed: Jun. 2, 2022

(65) Prior Publication Data

US 2022/0294106 A1 Sep. 15, 2022

Related U.S. Application Data

(63) Continuation of application No. PCT/KR2020/016920, filed on Nov. 26, 2020.

(30) Foreign Application Priority Data

Dec. 5, 2019 (KR) ........................ 10-2019-0161017

(51) Int. Cl.
*H01Q 1/36* (2006.01)
*H01Q 1/38* (2006.01)
(Continued)

(52) U.S. Cl.
CPC ................ *H01Q 1/36* (2013.01); *H01Q 1/38* (2013.01); *H01Q 9/045* (2013.01); *H01Q 1/48* (2013.01)

(58) Field of Classification Search
CPC ......... H01Q 1/00-528; H01Q 9/00-46; H01Q 9/045
See application file for complete search history.

(56) References Cited

U.S. PATENT DOCUMENTS 11,276,917 B2 * 3/2022 Kim ......................... H01Q 1/48
2002/0196192 A1 * 12/2002 Nagumo ................ H01Q 5/392 343/702

(Continued)

FOREIGN PATENT DOCUMENTS

CN 102097675 A 6/2011
CN 110366718 A 10/2019

(Continued)

OTHER PUBLICATIONS

Lee et al.; Optically Transparent Nano-Patterned Antennas: A Review and Future Directions; May 31, 2018; Applied Sciences, 8(6), 901. (Year: 2018).*

(Continued)

*Primary Examiner* — Ab Salam Alkassim, Jr.
(74) *Attorney, Agent, or Firm* — The PL Law Group, PLLC

(57) ABSTRACT

An antenna device according to an embodiment of the present invention includes a dielectric layer and an antenna unit disposed on a top surface of the dielectric layer. The antenna unit includes a mesh structure. The mesh structure of the antenna unit includes unit cells that are repeatedly arranged, and diagonal lines of each unit cell are inclined with respect to a width direction or a length direction of the antenna device. The antenna device having reduced pattern visibility and having improved transmittance and signal sensitivity is provided.

16 Claims, 5 Drawing Sheets

(51) Int. Cl.
*H01Q 1/48* (2006.01)
*H01Q 9/04* (2006.01)

(56) References Cited

U.S. PATENT DOCUMENTS

| | | | | |
|---|---|---|---|---|
| 2003/0132890 | A1 | 7/2003 | Rawnick et al. | |
| 2009/0051620 | A1* | 2/2009 | Ishibashi | H01Q 9/16 343/897 |
| 2009/0140938 | A1* | 6/2009 | Ishibashi | H01Q 1/44 343/897 |
| 2016/0134008 | A1* | 5/2016 | Kim | H01Q 21/28 343/711 |
| 2016/0190678 | A1* | 6/2016 | Hong | H01Q 1/44 343/700 MS |
| 2016/0344089 | A1* | 11/2016 | Baik | H01Q 1/273 |
| 2017/0141472 | A1* | 5/2017 | Park | H01Q 9/0414 |
| 2020/0259245 | A1* | 8/2020 | Kim | H01Q 1/243 |
| 2020/0259246 | A1* | 8/2020 | Kim | H01Q 21/28 |
| 2021/0135340 | A1* | 5/2021 | Kim | H01Q 1/245 |
| 2022/0140482 | A1* | 5/2022 | Lee | H05K 1/0243 343/905 |
| 2022/0140495 | A1* | 5/2022 | Kim | H01Q 9/0407 343/700 MS |
| 2022/0271412 | A1* | 8/2022 | Choi | H01Q 21/24 |
| 2022/0276682 | A1* | 9/2022 | Yu | G06F 1/1698 |
| 2022/0285840 | A1* | 9/2022 | Lee | H01Q 1/44 |
| 2022/0393338 | A1* | 12/2022 | Kim | G06F 3/0446 |
| 2023/0097532 | A1* | 3/2023 | Lee | H01Q 9/30 343/702 |
| 2023/0098313 | A1* | 3/2023 | Lee | H01Q 9/045 343/846 |
| 2023/0108271 | A1* | 4/2023 | Park | H01Q 19/005 343/725 |
| 2023/0110601 | A1* | 4/2023 | Lee | H01Q 1/22 455/566 |
| 2023/0122586 | A1* | 4/2023 | Park | H01Q 19/005 343/848 |
| 2023/0208052 | A1* | 6/2023 | Lee | H01Q 5/35 343/702 |
| 2023/0216178 | A1* | 7/2023 | Choi | H01Q 1/243 343/702 |
| 2023/0238692 | A1* | 7/2023 | Ahn | H01Q 1/364 343/700 MS |
| 2023/0299496 | A1* | 9/2023 | Kim | H01Q 15/168 |
| 2023/0420855 | A1* | 12/2023 | Park | H01Q 9/40 |
| 2024/0162616 | A1* | 5/2024 | Feng | H01Q 21/08 |
| 2024/0258689 | A1* | 8/2024 | Tian | H01Q 1/243 |
| 2024/0291153 | A1* | 8/2024 | Sung | H01Q 9/0407 |
| 2024/0339758 | A1* | 10/2024 | Li | H01Q 9/285 |
| 2025/0013089 | A1* | 1/2025 | Sakaki | H05K 1/02 |

FOREIGN PATENT DOCUMENTS

| | | | | | |
|---|---|---|---|---|---|
| CN | 215184524 | U | | 12/2021 | |
| EP | 911906 | A2 | * | 4/1999 | H01Q 9/0407 |
| EP | 1-868-261 | A1 | | 12/2007 | |
| JP | 10-126146 | A | | 5/1998 | |
| JP | 2007-251625 | A | | 9/2007 | |
| JP | 2017175540 | A | * | 9/2017 | |
| KR | 20090065649 | A | * | 6/2009 | |
| KR | 10-2016-0080444 | A | | 7/2016 | |
| KR | 10-1940798 | B1 | | 1/2019 | |
| KR | 10-2019-0021838 | A | | 3/2019 | |
| KR | 10-1962820 | B1 | | 3/2019 | |
| KR | 10-1973742 | B1 | | 4/2019 | |
| KR | 101971441 | B1 | * | 4/2019 | |
| KR | 10-2019-0105812 | A | | 9/2019 | |
| WO | WO 2019/172609 | A1 | | 9/2019 | |
| WO | WO 2019/177382 | A1 | | 9/2019 | |

OTHER PUBLICATIONS

International Search Report for PCT/KR2020/016920 mailed on Mar. 3, 2021.

* cited by examiner

ANTENNA DEVICE AND DISPLAY DEVICE INCLUDING THE SAME

CROSS-REFERENCE TO RELATED APPLICATION AND CLAIM OF PRIORITY

The present application is a continuation application to International Application No. PCT/KR2020/016920 with an International Filing Date of Nov. 26, 2020, which claims the benefit of Korean Patent Application No. 10-2019-0161017 filed on Dec. 5, 2019 at the Korean Intellectual Property Office, the disclosures of which are incorporated by reference herein in their entirety.

BACKGROUND

1. Field

The present invention relates to an antenna device and a display device including the same. More particularly, the present invention relates to an antenna device including a radiator and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as thin-layered display devices with high transparency and resolution such as a transparent display device, a flexible display device, etc., have been developed recently, the antenna having improved transparency and flexibility is also required.

As a screen of the display device becomes expanded, a space or an area of a bezel portion or a light-shielding portion is decreasing. In this case, a space or an area for accommodating the antenna is also decreased, and thus a radiator for a signal transmission and reception in the antenna may overlap a display area of the display device. Accordingly, an image from the display device may be shielded by the radiator, or the radiator may be visually recognized by a user to deteriorate an image quality.

If patterns in the antenna are formed as a mesh pattern, interruption with pixels of a display panel may occur to cause a moire phenomenon and an electrode recognition.

For example, Korean Published Patent Application No. 2016-0080444 discloses an antenna structure embedded in a mobile terminal, but fails to consider an image degradation by the antenna.

SUMMARY

According to an aspect of the present invention, there is provided an antenna device having improved visual properties and signaling efficiency.

According to an aspect of the present invention, there is provided a display device including an antenna device with improved visual properties and signaling efficiency.

(1) An antenna device, including: a dielectric layer; and an antenna unit disposed on a top surface of the dielectric layer, the antenna unit including a mesh structure, wherein the mesh structure of the antenna unit includes unit cells that are repeatedly arranged, and diagonal lines of each unit cell are inclined with respect to a width direction or a length direction of the antenna device.

(2) The antenna device according to the above (1), wherein the unit cell has a rhombus shape, and an angle between a long diagonal line of the unit cell and the length direction is from 2° to 45°.

(3) The antenna device according to the above (1), wherein the antenna unit includes a radiator, a transmission line extending from one side of the radiator and a signal pad electrically connected to an end portion of the transmission line.

(4) The antenna device according to the above (3), wherein a sidewall of the signal pad extends in the length direction, and the transmission line and the radiator are inclined with respect to the length direction.

(5) The antenna device according to the above (3), wherein the sidewall of the signal pad and the transmission line extend in the length direction, and the radiator is inclined with respect to the length direction.

(6) The antenna device according to the above (3), further including a pair of ground patterns facing each other with the signal pad interposed therebetween to be electrically and physically separated from the transmission line.

(7) The antenna device according to the above (6), wherein the pair of the ground patterns are asymmetric to each other.

(8) The antenna device according to the above (7), wherein each of the pair of the ground patterns includes a first portion and a second portion obliquely extending from the first portion.

(9) The antenna device according to the above (8), wherein the first portion includes a solid metal pattern, and the second portion includes a mesh structure.

(10) The antenna device according to the above (8), wherein the second portions included in the pair of the ground patterns are asymmetric to each other with the transmission line interposed therebetween, and the first portions included in the pair of the ground patterns are symmetric to each other with the signal pad interposed therebetween.

(11) The antenna device according to the above (6), wherein the radiator, the transmission line, the signal pad and the ground pattern are disposed at the same level on the top surface of the dielectric layer.

(12) The antenna device according to the above (1), further including a dummy mesh pattern disposed around the radiator to be electrically separated from the radiator.

(13) The antenna device according to the above (12), wherein the dummy mesh pattern includes a mesh structure having the same shape and orientation as those of the mesh structure included in the antenna unit.

(14) The antenna device according to the above (1), further including a ground layer disposed on a bottom surface of the dielectric layer.

(15) A display device including the antenna device according to embodiments as described above.

According to exemplary embodiments of the present invention, an antenna device may include a radiator having a mesh structure in which a plurality of unit cells are assembled. Diagonal lines of the unit cell of the radiator may be inclined with respect to a width direction or a length direction of the antenna device.

Accordingly, a polarization property of an antenna may be adjusted so that a broadband transmission/reception may be implemented, and an antenna having improved performance and reduced signal interference may be achieved. Further, a moiré phenomenon due to interference with other electronic devices such as display pixels may be prevented and an electrode visibility may be also suppressed.

The antenna element may be inserted or mounted on a front side of a display device to implement transmission/reception of 3G or higher, for example, 5G high frequency band. Thus, a signal sensitivity and a transmittance may be increased while minimizing degradation of an image quality deterioration of the display device.

Additionally, the antenna device may include a mesh structure formed of a metallic material to have improved flexibility, and may be effectively applied to a flexible display device.

DETAILED DESCRIPTION OF THE EMBODIMENTS

According to exemplary embodiments of the present invention, there is provided an antenna device including a radiator that has a mesh structure and having improved transmittance and signaling sensitivity.

The antenna device may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
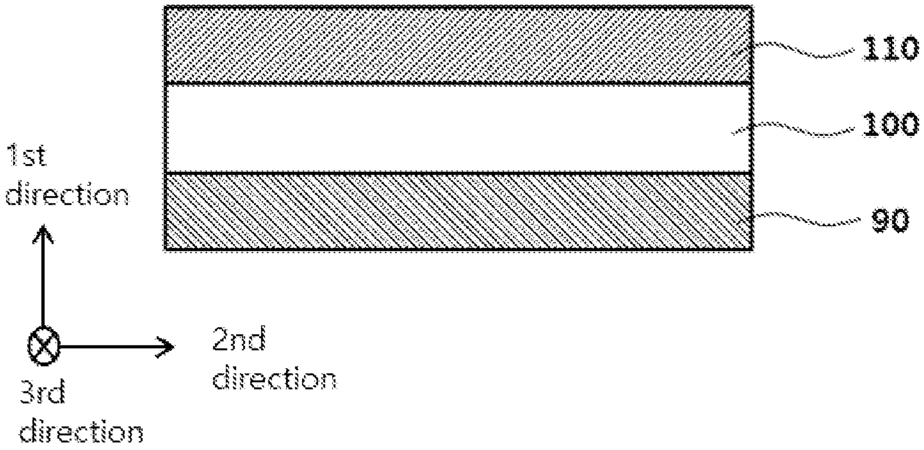
FIGS. 1 and 2 are a schematic cross-sectional view and a schematic top planar view, respectively, illustrating an antenna device in accordance with exemplary embodiments.
Figure 2:
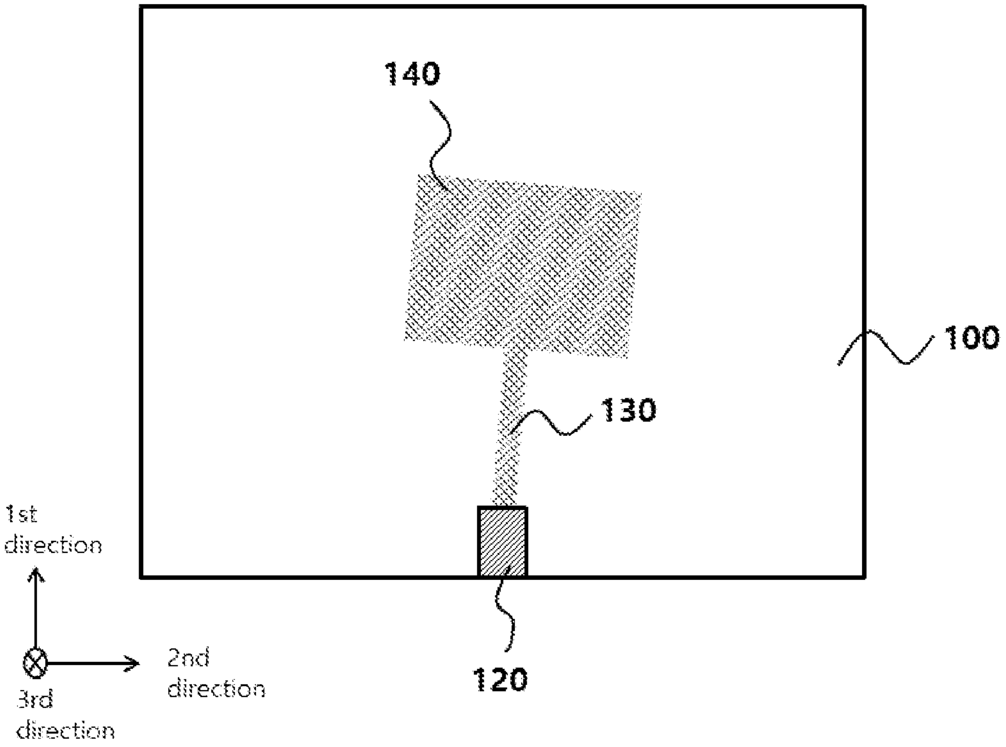

FIGS. 1 and 2 are a schematic cross-sectional view and a schematic top planar view, respectively, illustrating an antenna device in accordance with exemplary embodiments.

In FIGS. 1 and 2, two directions parallel to a top surface of a dielectric layer 100 and crossing each other are defined as a first direction and a second direction. For example, the first direction and the second direction may be perpendicular to each other. A direction vertical to the top surface of the dielectric layer 100 is defined as a third direction. For example, the first direction may correspond to a length direction of the antenna device, the second direction may correspond to a width direction of the antenna device and a third direction may correspond to a thickness direction of the antenna device. The definitions of the directions are applied to other accompanying drawings.

Referring to FIG. 1, the antenna device according to exemplary embodiments may include a dielectric layer 100 and an antenna unit layer 110 disposed on a top surface of the dielectric layer 100. The antenna device may further include a ground layer 90 disposed on a bottom surface of the dielectric layer 100.

The dielectric layer 100 may include an insulating material having a predetermined dielectric constant. The dielectric layer 100 may include, e.g., an inorganic insulating material such as glass, silicon oxide, silicon nitride or a metal oxide, or an organic insulating material such as an epoxy resin, an acrylic resin or an imide-based resin. The dielectric layer 100 may serve as a film substrate for the antenna device on which the antenna unit layer 110 is formed. Additionally, a material having flexibility capable of being folded may be used to be applied to a flexible display device.

The dielectric layer 100 may include a transparent film. For example, the dielectric layer 100 may include a polyester-based resin such as polyethylene terephthalate, polyethylene isophthalate, polyethylene naphthalate and polybutylene terephthalate: a cellulose-based resin such as diacetyl cellulose and triacetyl cellulose; a polycarbonate-based resin: an acrylic resin such as polymethyl (meth) acrylate and polyethyl (meth)acrylate: a styrene-based resin such as polystyrene and an acrylonitrile-styrene copolymer: a polyolefin-based resin such as polyethylene, polypropylene, a cycloolefin or polyolefin having a norbornene structure and an ethylene-propylene copolymer: a vinyl chloride-based resin; an amide-based resin such as nylon and an aromatic polyamide: an imide-based resin: a polyethersulfone-based resin; a sulfone-based resin: a polyether ether ketone-based resin: a polyphenylene sulfide resin; a vinyl alcohol-based resin; a vinylidene chloride-based resin: a vinyl butyral-based resin: an allylate-based resin: a polyoxymethylene-based resin: an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 100.

Capacitance or inductance may be formed between the antenna unit layer 110 and a ground layer 90 by the dielectric layer 100, so that a frequency band at which the antenna device may be driven or operated may be adjusted. In some embodiments, a dielectric constant of the dielectric layer 100 may be adjusted in a range from about 1.5 to about 12. When the dielectric constant exceeds about 12, a driving frequency may be excessively decreased, so that driving in a desired high frequency band may not be implemented.

The antenna unit layer 110 may be disposed on the top surface of the dielectric layer 90. The antenna unit layer 110 may include an antenna unit of the antenna device. The antenna unit may include a radiator 140, a transmission line 130 and a pad electrode 120.

In exemplary embodiments, the antenna unit layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals.

For example, the radiator 140 may include silver (Ag) or a silver alloy (e.g. silver-palladium-copper (APC)), or copper (Cu) or a copper alloy (e.g., a copper-calcium (CuCa)) to implement a low resistance and a fine line width pattern.

In some embodiments, the antenna unit layer 110 may include a transparent conductive oxide such as indium tin oxide (ITO), indium zinc oxide (IZO), indium zinc tin oxide (ITZO), zinc oxide (ZnOx), etc.

For example, the antenna unit layer 110 may have a multi-layered structure including a metal or alloy layer, and a transparent metal oxide layer.

The ground layer 90 may be formed on the bottom surface of the dielectric layer 90. The ground layer 90 may serve as a ground of the antenna unit layer 110. For example, capacitance or inductance may be formed in the thickness direction of the antenna device between the radiator 140 and the ground layer 90 by the dielectric layer 100, so that a frequency band at which the antenna device may be driven or operated may be adjusted. For example, the antenna device may serve as a vertical radiation antenna by the ground layer 90.

In an embodiment, a conductive member of a display device or a display panel to which the antenna device may be applied may serve as the ground layer 80. For example, the conductive member may include various wirings or electrodes such as a gate electrode, a source electrode, a drain electrode, a pixel electrode, a common electrode, a data line, a scan line, etc., included in a thin film transistor (TFT) array panel.

In an embodiment, a metallic member such as a SUS plate, a sensor member such as a digitizer, a heat dissipation sheet, etc., disposed at a rear portion of the display device may serve as the ground layer 80.

Referring to FIG. 2, the antenna unit may include a radiator 140 and a transmission line 130. The antenna unit may further include a signal pad 120 connected to an end portion of the transmission line 130.

For convenience of descriptions, only one antenna unit is illustrated in FIG. 2, but a plurality of the antenna units may be arranged on the dielectric layer 100 in an array form. In this case, the ground layer 90 may be formed to have a sufficient area to cover the entire the array of antenna units.

The transmission line 130 of the antenna unit may extend from one end of the radiator 140 to be electrically connected to the signal pad 120. For example, the transmission line 130 may protrude and extend from a central portion of one side of the radiator 140.

For example, a circuit board such as a flexible circuit board (FPCB) may be bonded to the signal pad 120, and a driving circuit unit may be disposed on the flexible circuit board. Accordingly, signal transmission/reception may be implemented between the antenna unit and the driving circuit unit.

The signal pad 120 may have a solid structure including the metal or alloy as described above to reduce a signal resistance.

In exemplary embodiments, the radiator 140, the transmission line 130 and the signal pad 120 may all be located at the same layer or at the same level on the top surface of the dielectric layer 100.

The radiator 140 and the transmission line 130 of the antenna unit may include a mesh structure. Accordingly, a transmittance of the radiator 140 may be increased, and flexibility of the antenna device may be improved. Thus, the antenna device may be effectively applied to a flexible display device.

The antenna unit having the mesh structure may include unit cells that are repeatedly arranged. In this case, the unit cell may be formed in a polygonal structure such as a rhombus, a hexagon or a square.

All diagonal lines of the unit cell may be inclined with respect to the width direction or the length direction of the antenna device. Accordingly, a polarization property of the antenna may be adjusted so that a broadband transmission and reception may be implemented, and a signal interference may be reduced to implement an antenna with improved performance. Further, a moiré phenomenon due to interference with another electronic device such as a display pixel may be suppressed, and a visual recognition of electrodes may be also suppressed.

In exemplary embodiments, the transmission line 130 and the radiator 140 may be inclined with respect to the length direction of the antenna unit. In this case, the length direction may be a first direction, and a sidewall of the signal pad may extend in the length direction.

In this case, the transmission line 130 may include substantially the same conductive material as that of the radiator 140, and may be formed by substantially the same etching process. In this case, the transmission line 130 may be integrally connected with the radiator 140 to be provided as a substantially single member. For example, the transmission line 130 and the radiator 140 may include a mesh structure having substantially the same shape (e.g., the same line width, the same spacing distance, the same orientation).

In some embodiments, the radiator 140 may be inclined with respect to the length direction of the antenna unit. In this case, the length direction may be a first direction, and a sidewall of the signal pad may extend in the length direction.

The mesh structure may be utilized and conductive lines included in the mesh structure may be formed of a low-resistance metal such as copper, silver, an APC alloy, a CuCa alloy, or the like, thereby suppressing a resistance increase. Thus, a transparent antenna device having a low resistance and a high sensitivity may be effectively achieved.

Figure 3:
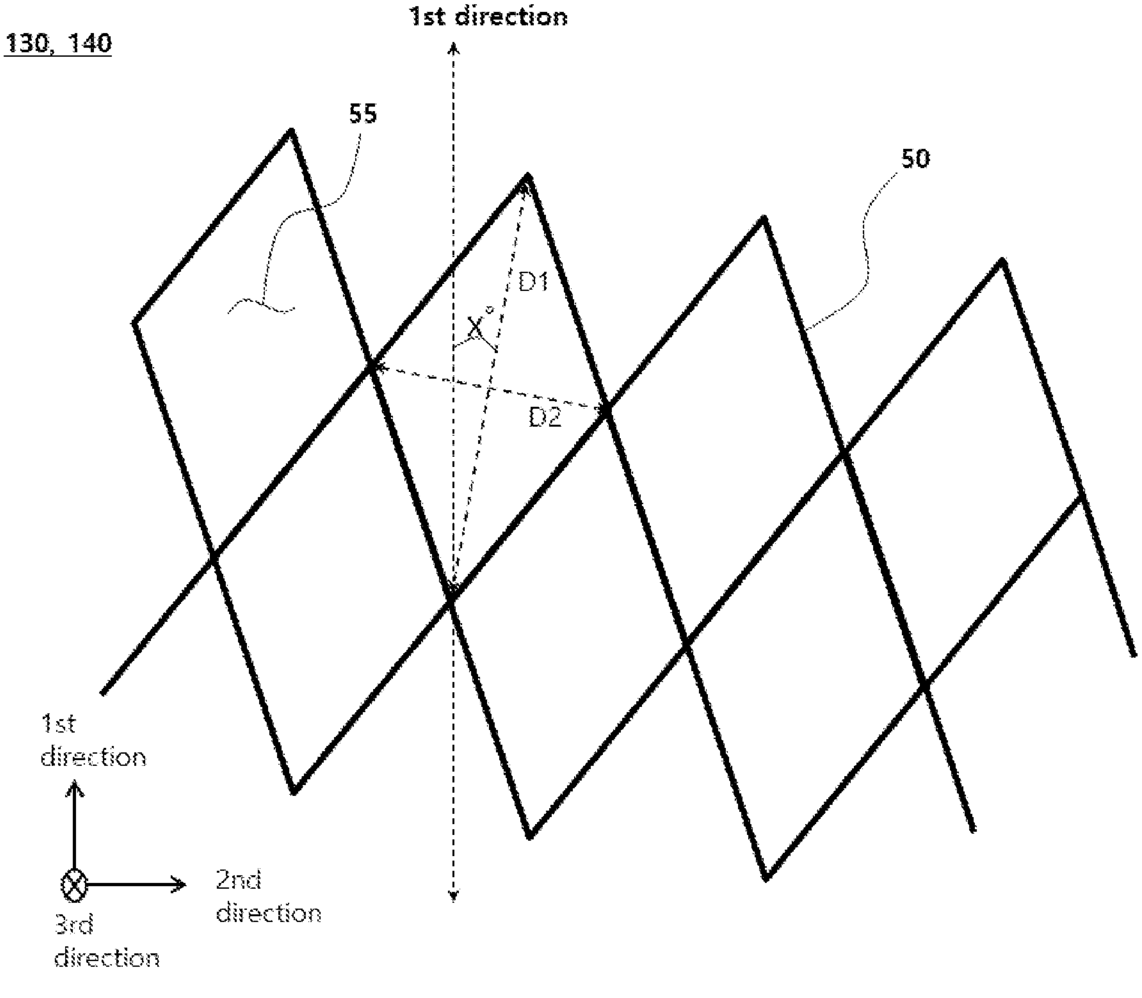
FIG. 3 is a schematic top planar view illustrating a mesh structure included in a radiator in accordance with exemplary embodiments.

FIG. 3 is a schematic top planar view illustrating a mesh structure included in a radiator in accordance with exemplary embodiments. For convenience of descriptions, an illustration of the dielectric layer is omitted in FIG. 3.

Referring to FIG. 3, the mesh structure included in the radiator 140 and the transmission line 130 may be defined by conductive lines 50 intersecting each other.

The mesh structure may include a unit cell 55 defined by the conductive lines 50 intersecting substantially in a honeycomb shape, and a plurality of the unit cells 55 may be aggregated to form the mesh structure of the antenna unit.

In exemplary embodiments, the unit cell 55 may have a substantially rhombus shape. In this case, two diagonal lines of the unit cell 55 may each be indicated by D1 and D2, respectively. For example, a long diagonal line may be indicated by D1 and a short diagonal line may be indicated by D2.

The long diagonal line D1 of the unit cell 55 may be inclined with respect to the length direction of the antenna device. In this case, the length direction may be substantially the same as the first direction.

In exemplary embodiments, the long diagonal line of the unit cell 55 may be formed to be inclined at an angle from 2° to 45° to the length direction. When the angle between the long diagonal line and the length direction of the unit cell 55 is less than 2°, the long diagonal line of the unit cell 55 may be formed in substantially the same direction as the length direction, and thus an interruption between various electronic devices of the display device and the radiator 140 may be caused.

When the angle between the long diagonal and the length direction of the unit cell 55 exceeds 45°, the length of the transmission line 130 may increase to cause a signal loss due to a resistance increase. Further, a spatial efficiency of the antenna unit may be deteriorated.

Preferably, the angle formed between the long diagonal line and the length direction of the unit cell 55 may be 4° to 22.5°.

In some embodiments, when the unit cell 55 has a substantially rhombus shape, a length of the long diagonal line D1 may be from about 100 μm to about 400 μm, and a length of the short diagonal line D2 may be about from about 20 μm to about 200 μm. Within the above range, the electrode visibility may be substantially prevented and the antenna unit having improved transmittance may be more effectively obtained.

In an embodiment, a line width of the conductive line 50 may be from 0.5 μm to 5 μm in consideration of prevention of the electrode visibility and reduction of a resistance of the antenna unit.

Figure 4:
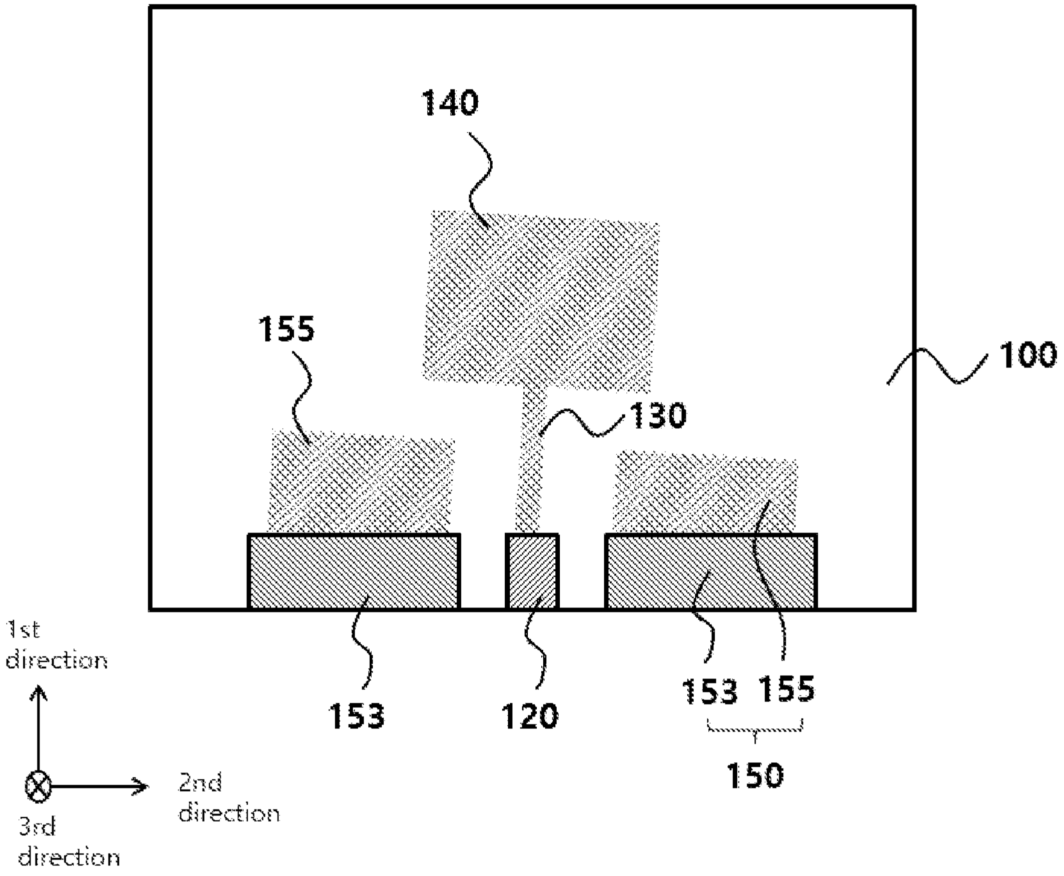
FIGS. 4 and 5 are schematic top planar views illustrating antenna devices in accordance with some exemplary embodiments.
Figure 5:
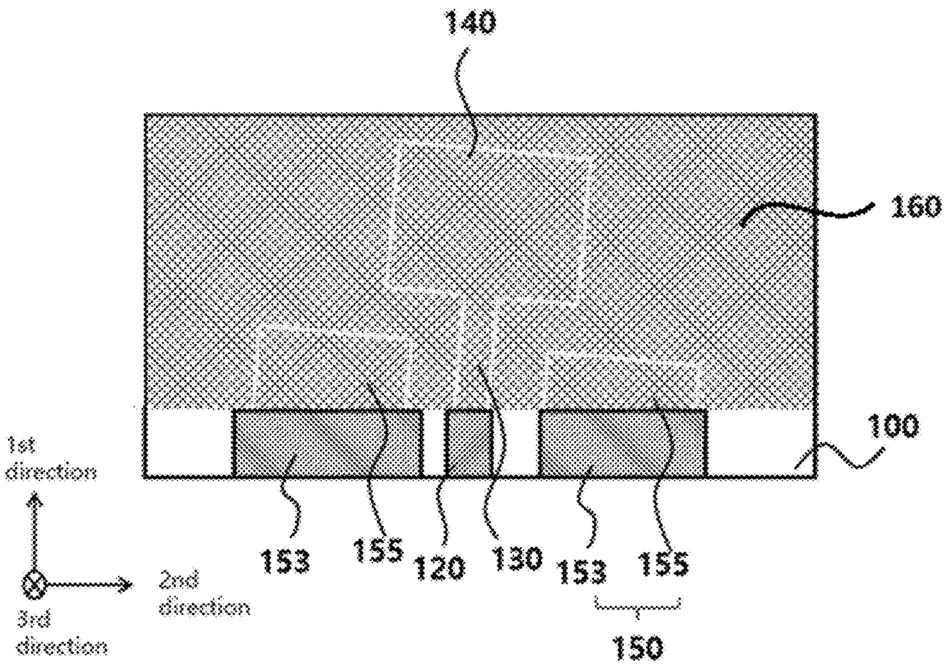

FIGS. 4 and 5 are schematic top planar views illustrating antenna devices in accordance with some exemplary embodiments. Detailed descriptions of elements and constructions substantially the same as or similar to those described with reference to FIGS. 1 to 3 are omitted herein.

Referring to FIG. 4, the antenna device may further include a pair of ground patterns 150 spaced apart from each other with the signal pad 120 interposed therebetween.

The ground pattern 150 may be electrically and physically separated from the transmission line 130 and the signal pad 120. The pair of the ground patterns 150 may have asymmetric shapes with each other.

The radiator 140, the transmission line 130, the signal pad 120 and the ground pattern 150 may all be located at the same layer or at the same level on the top surface of the dielectric layer 100.

In exemplary embodiments, the ground pattern 150 may be divided into a first portion 153 and a second portion 155. In this case, the second portion 155 may extend obliquely with respect to the first portion 153. The first portion 153 may include a solid metal pattern, and the second portion 155 may include a mesh structure.

The second portion 155 of the ground pattern 150 may include a mesh structure having substantially the same shape as that of the radiator 140. For example, the second portion 155 and the radiator 140 may include a mesh structure having the same line width, the same spacing and the same orientation. Additionally, the second portion 155 of the ground pattern 150 may include substantially the same conductive material as that of the radiator 140 and the transmission line 130, and may be formed through substantially the same etching process.

Each diagonal line of the unit cell 55 of the mesh structure may be formed to be inclined with respect to the width direction or the length direction of the antenna device. For example, the long diagonal line D2 of the unit cell 55 may be inclined with respect to the length direction. Preferably, the mesh structure included in the second portion 155, the radiator 140 and the transmission line 130 may be inclined with the same angle.

In some embodiments, the second portions 155 may have an asymmetric shape with the transmission line 130 interposed therebetween. The first portions 153 may have a symmetrical shape with the signal pad 120 interposed therebetween.

Referring to FIG. 5, the antenna unit layer 110 may further include a dummy mesh pattern 160 arranged around the antenna unit to be electrically and physically separated or spaced apart from the antenna unit and the ground pattern 150.

In some embodiments, the dummy mesh pattern 160 may also include a mesh structure, and may include a mesh structure having substantially the same shape as that in the radiator 140. In some embodiments, the dummy mesh pattern 160 and the radiator 140 may include the same metal.

Accordingly, an electrode arrangement around the antenna unit may become uniform, and the mesh structure of the antenna unit or the conductive lines included therein may be prevented from being visually recognized by the user of the display device due to local deviations of the electrode arrangement.

Figure 6:
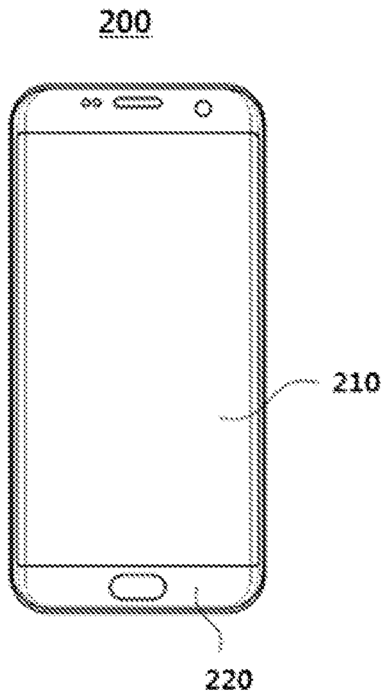
FIG. 6 is a schematic top planar view illustrating a display device in accordance with exemplary embodiments.

FIG. 6 is a schematic top planar view illustrating a display device in accordance with some exemplary embodiments. For example, FIG. 6 illustrates an outer shape including a window of a display device.

Referring to FIG. 6, a display device 200 may include a display area 210 and a peripheral area 220. For example, the peripheral area 220 may be positioned on both lateral portions and/or both end portions of the display area 210.

In some embodiments, the above-described antenna device may be inserted into the peripheral region 220 of the display device 200 in the form of a patch or film. In some embodiments, the radiator 140 of the antenna device as described above may be disposed to at least partially correspond to the display area 210 of the display device 200, and the signal pad 120 may be disposed to correspond to the peripheral area 220 of the display device 200.

The peripheral area 220 may correspond to, e.g., a light-shielding portion or a bezel portion of an image display device. Additionally, a driving integrated circuit (IC) chip for controlling driving/radiation properties of the antenna device and supplying a feeding signal may be disposed in the peripheral area 220. In this case, the signal pad 120 of the antenna device may be adjacent to the driving integrated circuit chip so that a signal transmission/reception path may be shortened, thereby suppressing a signal loss.

In some embodiments, the mesh structure of the antenna device may be disposed in the display area 210. A diagonal line of the unit cell 55 included in the mesh structure may be oblique to the length direction (e.g., the first direction) of the antenna device with a predetermined angle. Accordingly, degradation of the image quality by the antenna unit including the mesh structure may be prevented.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Example 1

A radiator and a transmission line having a mesh structure were formed using an alloy (APC) of silver (Ag), palladium (Pd), and copper (Cu) on a top surface of a glass dielectric layer (0.7 T). The conductive line included in the mesh structure was formed to have a line width of 2.5 μm and a thickness (or height) of 2000 Å, and the mesh structure was formed to have a unit cell of a rhombus shape. A length of an X-axis diagonal line (a short diagonal line) of the rhombus unit cell was 150 μm, and a length of a Y-axis diagonal line (a long diagonal length) was 250 μm.

The long diagonal line of the rhombus unit cell of the mesh structure was formed to be inclined with an angle of 2° with respect to the first direction (Y-axis direction).

Example 2

An antenna device was formed by the same method as that of Example 1, except that the long diagonal line of the rhombus unit cell of the mesh structure was formed to be inclined with an angle of 10° with respect to the first direction (Y-axis direction).

Example 3

An antenna device was formed by the same method as that of Example 1, except that the long diagonal line of the rhombus unit cell of the mesh structure was formed to be inclined with an angle of 20° with respect to the first direction (Y-axis direction).

Example 4

An antenna device was formed by the same method as that of Example 1, except that the long diagonal line of the rhombus unit cell of the mesh structure was formed to be inclined with an angle of 45° with respect to the first direction (Y-axis direction).

Example 5

An antenna device was formed by the same method as that of Example 1, except that the long diagonal line of the rhombus unit cell of the mesh structure was formed to be inclined with an angle of 50° with respect to the first direction (Y-axis direction).

Comparative Example

A long diagonal line of the rhombus unit cell of the mesh structure was formed to be inclined with an angle of 0° with respect to the first direction (Y-axis direction). That is, the long diagonal line of the unit cell was parallel to the first direction (Y-axis direction).

EXPERIMENTAL EXAMPLE (1) Evaluation of Antenna Driving Property

A feeding was performed to each antenna device of Examples and Comparative Example, and an antenna gain was measured.

(2) Evaluation of Electrode Visibility

Each antenna device of Examples and Comparative Examples was observed with naked eyes to evaluate whether conductive lines or the mesh structure were visually recognized. Specifically, 10 panels observed the antenna device, and the electrode visibility was evaluated by the number of panels who determined that electrode pattern was clearly recognized as described below.

◎: 0 of 10 panels
○: 1-3 of 10 panels
Δ: 4-5 of 10 panels
x: 6 or more of 10 panels The results are shown in Table 1 below.

TABLE 1

| | Angle (°) | Gain(dB) | Electrode Visibility |
|---|---|---|---|
| Example 1 | 2 | 3.86 | ○ |
| Example 2 | 10 | 4.15 | ◎ |
| Example 3 | 25 | 3.25 | ◎ |
| Example 4 | 45 | 3.17 | ○ |
| Example 5 | 50 | 3.05 | ○ |
| Comparative Example | 0 | 3.57 | X |

Referring to Table 1, in Examples where the mesh structures were formed to be oblique with predetermined angles with respect to the first direction, high gain properties were obtained due to improved signaling efficiency when compared to Comparative Example.

Additionally, moire phenomenon and electrode visual recognition were clearly caused in Comparative Example. However, in the antenna devices of Examples, the mesh structure and the conductive lines included therein were prevented from being visually recognized by a user of a display device.

What is claimed is:

1. An antenna device, comprising:
a dielectric layer; and
an antenna unit disposed on a top surface of the dielectric layer, the antenna unit including a mesh structure,
wherein the mesh structure of the antenna unit includes unit cells defined by conductive lines intersecting each other, and the unit cells are repeatedly arranged, wherein the conductive lines of each unit cell and diagonal lines of each unit cell are inclined with respect to a width direction and a length direction of the antenna device.

2. The antenna device according to claim 1, wherein the unit cell has a rhombus shape, and an angle between a long diagonal line of the unit cell and the length direction is from 2° to 45°.

3. The antenna device according to claim 1, wherein the antenna unit comprises a radiator, a transmission line extending from one side of the radiator and a signal pad electrically connected to an end portion of the transmission line.

4. The antenna device according to claim 3, wherein a sidewall of the signal pad extends in the length direction, and the transmission line and the radiator are inclined with respect to the length direction.

5. The antenna device according to claim 3, wherein a sidewall of the signal pad and the transmission line extend in the length direction, and the radiator is inclined with respect to the length direction.

6. The antenna device according to claim 3, further comprising a pair of ground patterns facing each other with the signal pad interposed therebetween to be electrically and physically separated from the transmission line.

7. The antenna device according to claim 6, wherein the pair of the ground patterns are asymmetric to each other.

8. The antenna device according to claim 7, wherein each of the pair of the ground patterns comprises a first portion and a second portion obliquely extending from the first portion.

9. The antenna device according to claim 8, wherein the first portion includes a solid metal pattern, and the second portion includes a mesh structure.

10. The antenna device according to claim 8, wherein the second portions included in the pair of the ground patterns are asymmetric to each other with the transmission line interposed therebetween, and the first portions included in the pair of the ground patterns are symmetric to each other with the signal pad interposed therebetween.

11. The antenna device according to claim 6, wherein the radiator, the transmission line, the signal pad and the ground pattern are disposed at the same level on the top surface of the dielectric layer.

12. The antenna device according to claim 3, further comprising a dummy mesh pattern disposed around the radiator to be electrically separated from the radiator.

13. The antenna device according to claim 12, wherein the dummy mesh pattern includes a mesh structure having the same shape and orientation as those of the mesh structure included in the antenna unit.

14. The antenna device according to claim 1, further comprising a ground layer disposed on a bottom surface of the dielectric layer.

15. A display device comprising the antenna device according to claim 1.

16. An antenna device, comprising:

a dielectric layer; and an antenna unit disposed on a top surface of the dielectric layer, the antenna unit including a mesh structure, the antenna unit comprising:

a radiator;

a transmission line extending from one side of the radiator;

a signal pad electrically connected to an end portion of the transmission line; and a pair of ground patterns facing each other with the signal pad interposed therebetween to be electrically and physically separated from the transmission line, wherein the pair of the ground patterns are asymmetric to each other, and the mesh structure of the antenna unit includes unit cells that are repeatedly arranged, and diagonal lines of each unit cell are inclined with respect to a width direction or a length direction of the antenna device.

* * * * *